US007460443B2

(12) United States Patent
Elmers, II et al.

(10) Patent No.: US 7,460,443 B2
(45) Date of Patent: Dec. 2, 2008

(54) FOLDER INDEXING METHOD FOR QUICKLY ACCESSING MEDIA FILES

(75) Inventors: Miles Martin Elmers, II, Phoenix, AZ (US); John Robert Berkheimer, Scottsdale, AZ (US)

(73) Assignee: Tyrell Corporation, Phoenix, AZ (US)

( * ) Notice: Subject to any disclaimer, the term of this patent is extended or adjusted under 35 U.S.C. 154(b) by 381 days.

(21) Appl. No.: 11/228,208

(22) Filed: Sep. 17, 2005

(65) Prior Publication Data
US 2006/0067171 A1 Mar. 30, 2006

Related U.S. Application Data

(60) Provisional application No. 60/610,875, filed on Sep. 17, 2004.

(51) Int. Cl.
*G11B 21/08* (2006.01)
(52) U.S. Cl. .................................................. 369/30.06
(58) Field of Classification Search ........................ None
See application file for complete search history.

(56) References Cited

U.S. PATENT DOCUMENTS 6,031,795 A * 2/2000 Wehmeyer .............. 369/30.28

| 6,430,117 B2 * | 8/2002 | Zimmer ................... 369/30.06 |
| 2002/0062258 A1 * | 5/2002 | Bailey et al. ................... 705/26 |
| 2003/0163486 A1 * | 8/2003 | Van Der Meulen ...... 707/104.1 |
| 2004/0044725 A1 * | 3/2004 | Bell et al. .................... 709/203 |
| 2006/0153020 A1 * | 7/2006 | Johnson et al. .......... 369/30.06 |

* cited by examiner

*Primary Examiner*—Joseph Feild
*Assistant Examiner*—Tawfik Goma
(74) *Attorney, Agent, or Firm*—The Hill Law Firm, PLC; Scott A. Hill

(57) ABSTRACT

The present invention is a folder indexing method that defines a format for storage and playback of digital audio files to support a specialized song selection access method. Access codes used to select media files for playback of music in a digital audio player, such as a juke box, are entered using track selection keys bearing the characters associated with the various access codes. At the software level, the track selection keys are assigned index values. Index values are used to locate a selected individual folder, but each individual folder uniquely stores only one media file. Preferably, folder names are only used for the purpose of alpha sorting folders so that index values can be used to count to a selected folder rather than searching for a term in a folder name. Multiple folder levels can be located using this method, but only the last folder level contains media files.

13 Claims, 5 Drawing Sheets

Fig. 1
Fig. 2
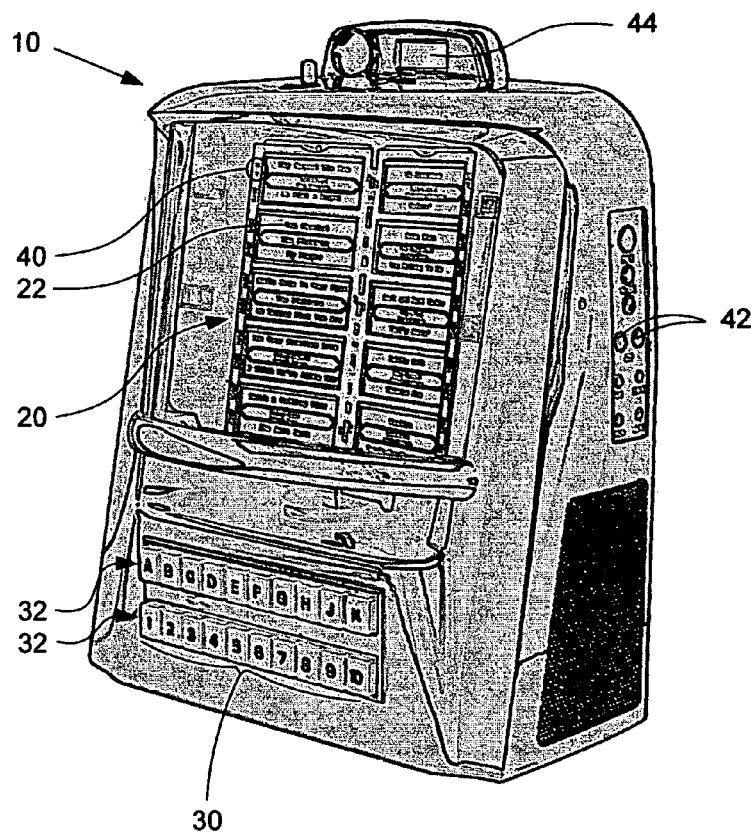
Fig. 3
| A1 | B1 | C1 | D1 | E1 | F1 | G1 | H1 | J1 | K1 |
| A2 | B2 | C2 | D2 | E2 | F2 | G2 | H2 | J2 | K2 |
| A3 | B3 | C3 | D3 | E3 | F3 | G3 | H3 | J3 | K3 |
| A4 | B4 | C4 | D4 | E4 | F4 | G4 | H4 | J4 | K4 |
| A5 | B5 | C5 | D5 | E5 | F5 | G5 | H5 | J5 | K5 |
| A6 | B6 | C6 | D6 | E6 | F6 | G6 | H6 | J6 | K6 |
| A7 | B7 | C7 | D7 | E7 | F7 | G7 | H7 | J7 | K7 |
| A8 | B8 | C8 | D8 | E8 | F8 | G8 | H8 | J8 | K8 |
| A9 | B9 | C9 | D9 | E9 | F9 | G9 | H9 | J9 | K9 |
| A10 | B10 | C10 | D10 | E10 | F10 | G10 | H10 | J10 | K10 |

FOLDER INDEXING METHOD FOR QUICKLY ACCESSING MEDIA FILES

CROSS REFERENCE TO RELATED APPLICATION

The present application is related to and claims priority under 35 U.S.C. 119(e) to U.S. Provisional Patent Application Ser. No. 60/610,875 filed Sep. 17, 2004, entitled "DIGITAL AUDIO PLAYER", the contents of which are hereby incorporated by reference in their entirety.

BACKGROUND OF THE INVENTION

In the past, users of vintage juke boxes were content to wait for a short period of time between their selection of a song and the actual initiation of playback because the interval was filled with observable operations of the machine, such as a mechanical arm grasping a record disc, moving it to the turntable location, and dropping the needle. A juke box's song library was printed on pages, often with a flipping mechanism, and each song was assigned an access code such as "J7" or "512". Music was played back from records. Even today, the large-scale mechanical operations involved in loading a record onto a turntable are visually entertaining, and the audible mechanical movements within a vintage juke box assure a user that the unit is working to prepare a music selection for playback. Moving a record onto a turntable involves considerable mechanical component movement, and a vintage juke box appears to do a very precise job, so most users don't mind waiting for a while to hear music. Juke box systems are still popular, such as those shown and described in U.S. Pat. Nos. 6,031,795 and 6,587,403, but many modern juke boxes use CD's instead of records for the playback of music, which may increase the number of selections available in some systems.

With the advent of digital music compression technology, such as the MP3 and WMA formats, the basic functionality of these juke boxes can now be carried in your pocket. Similar to a DVD player, a common MP3 player generates custom access menus based on the available media content. The difference here is that there is no single file which exists with all the information required to quickly generate the custom access menus, as is found on the DVD. The menu information for MP3 is embedded in each individual media file in multiple fields for artist name, song name, genre, etc., and must be gleaned from all the available files to build a database for a custom access menu. Acquiring all this information can take a great deal of time, especially for a large number of media files. For a user, this delay is an annoying waste of time, but tolerated because of the extraordinary volume of music that will be available from a very compact device. There are no large moving parts that suggest what the device is doing, and the operation of the device is virtually silent, so the only feedback to a user that indicates that the device is working is usually a small LCD screen. Unless the scattered embedded information is stored in permanent memory (or at least non-volatile memory), a user must wait again and again for this information to be rediscovered and processed. MP3 players are frequently updated with new music, which further complicates the process for generating custom access menus, so many MP3 products appear to be so slow that it seems like something is wrong, especially when they are based on CD storage. Every time the disc is changed the custom access menus must be reprocessed. This has contributed to an overall lack of popularity for the CD based format of MP3 players, even though they generally possess larger storage capacity than their flash memory competition. This lack of popularity is also a factor in why commercially produced music CD's in MP3 format are not available.

The Compact Disc Digital Audio (CD-DA) standard was introduced in 1982, and it was formatted as one continuous 70 minute long audio recording. A simple Table Of Contents (TOC) was created such that each track had a time code used by CD players for fast random access to tracks for features such as shuffle. This simple approach allowed a CD to be played almost immediately, which quickly won wide spread approval in the marketplace. This simple access method was also easy to specify and document, allowing a wide and rapid acceptance of the CD-DA format among manufacturers. This initial format allowed only for raw audio data to be stored on the CD, indexed only by time codes in the TOC. Audio format CD's use no filenames or folders, since the format does not provide adequate error correction for the lossless storage of data files. As such, the basic CD-DA format, which can only store 70 minutes of audio, is not suitable for storage of MP3 files.

In order for music CD's in the modern MP3 format to become commercially available that are customized for an MP3 player based juke box, all CD's should operate predictably on all systems. There is currently no standard for pre-storing a database of menu information along with the song files on a CD containing MP3 files. There is also no standard for a method of selecting songs using a simple vintage access code, like "G7". Standardization should be accomplished with a method that is easy to understand and implement, not a highly technical method for mastering a CD that is only used by a large CD mastering house. An example of an understandable method might be embedding an access code in a new ID3 tag, similar to the song title, etc., but in practice this would require a user to modify hundreds of files to make a custom CD. So much extra work would doom the product architecture to a short and unpopular lifetime, so a better approach that does not require the music files to be modified in any way is needed.

SUMMARY OF THE INVENTION

The preferred embodiment of the present invention utilizes elements of a "vintage" user interface from a 50's juke box in combination with the operation of a digital audio player that uses our folder indexing method for quickly accessing compressed media files. A vintage juke box's user interface featured track selection buttons which were pushed to enter an access code associated with a song selection displayed on a printed menu of songs. Using a similar access code method, we have created a portable system similar to a tabletop radio, but that will look more like a "wall box" remote from a 50's diner. Through the use of our folder indexing method, the product has quick and easy access to at least 100 songs and does not require knowledge of a PC to change the available music selections. A CD based MP3 player system is preferred so that it can play commercially made compatible music CD's or it is easily updatable on a user's PC with new music selections.

We have created a method that eliminates the time consuming step of searching for embedded information in media files that is used to build custom access menus in common MP3 players, so the names and descriptions of media files are not significant to us. The use of folders in other systems is solely to organize the media for the convenience of the customer. In no way do these folders help the player generate access menus. Because we wish to avoid the need to browse access menus on a small LCD screen, as well as eliminate the complicated rules for displaying access menus on a screen, we will not use the usual method of accessing a large number of MP3 audio files. The present invention utilizes an indexing method for accessing digital audio files without modifying the contents or names of the large number of media files to be accessed. Each media file is placed in its own individual folder that has been given a simple folder name that can be easily organized and searched. In this new access method only the names of the individual folders, not the contents, are useful for locating a media file to be played. Certain new behaviors are required of the player hardware. This method also eliminates the requirement of storing large amounts of custom data that no longer needs to be read from the disc, as would be the case in a common MP3 player. And like a DVD, when the behaviors are correctly implemented, a compatibly formatted disc should operate the same on all players.

BRIEF DESCRIPTION OF THE DRAWINGS

FIG. 1 is a perspective view the appearance of a juke box that is well suited for use with the folder indexing method of the present invention.

FIG. 2 is an elevation view showing a sample of a preferred format of the printed flipping pages used to display the menu of song titles.

FIG. 3 is the preferred array of access codes derived from the printed flipping pages of FIG. 2.

Figure 4:
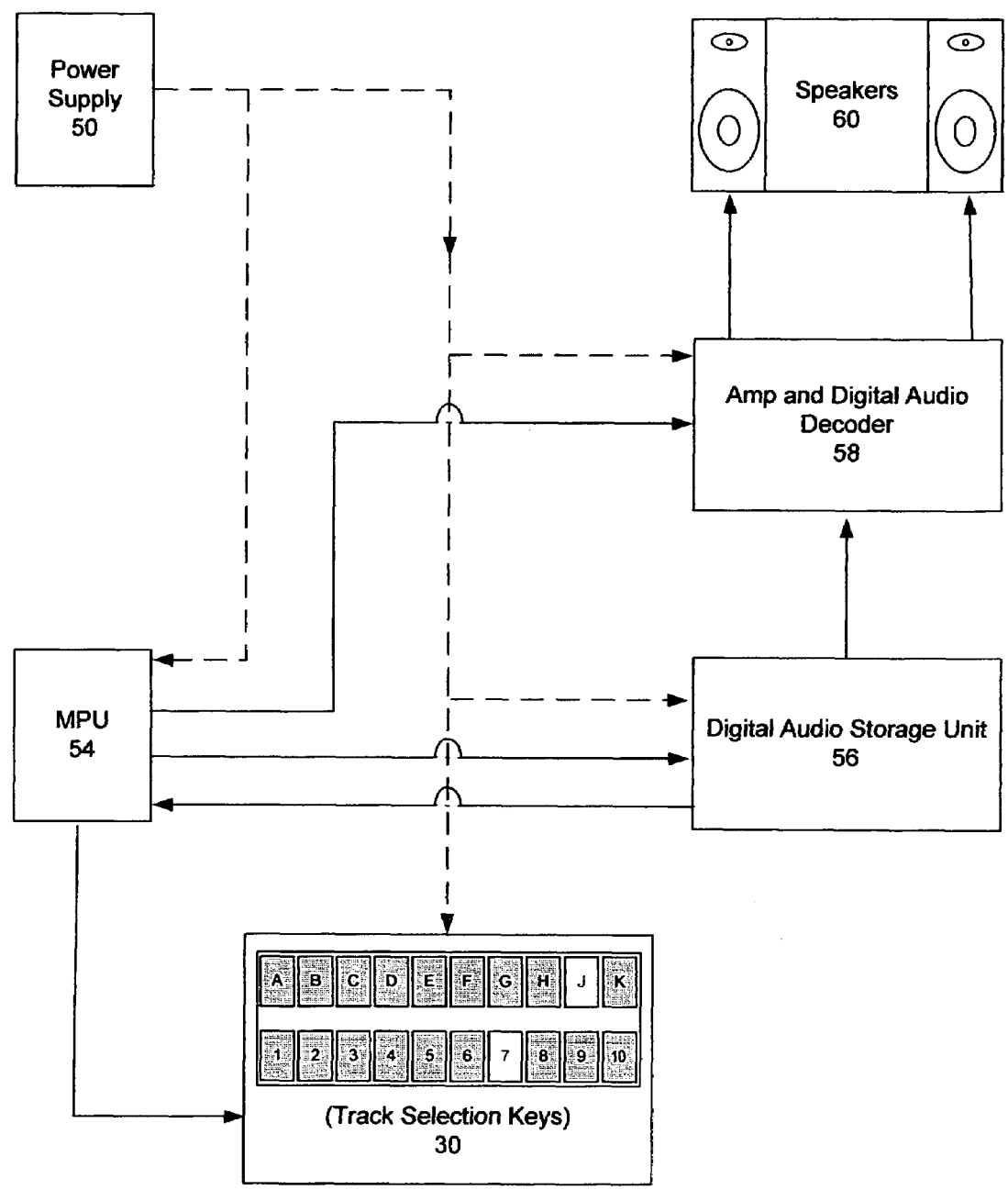
FIG. 4 is a system block diagram showing a computer architecture in which the present invention may be implemented.

The following is the menu of numerical callouts used in FIGS. 1-7:

10 Jukebox
20 Printed flipping pages
22 Song title
30 Track selection keys
32 Rows
40 Access code
42 Skip buttons
44 LCD screen
50 Power supply
54 MPU (micro processor unit)
56 Digital audio storage unit
58 Amp and digital audio decoder
60 Speakers
70 Initialization
72 Key press
74 Process key press
76 Execute command
78 Stop mode
80 Determine next track
82 Update displays
84 Power failure
90 First-level folders for a single-level folder layout
92 First-level folders for a multi-level folder layout
94 Second-level folders for a multi-level folder layout
98 Media Files

DETAILED DESCRIPTION OF THE INVENTION

For all of the variations of our folder indexing method, we will define that each media file will exist in its own individual folder. A folder's name becomes indirectly significant because it is used to define a location for a media file that is linked to an access code in the system. A digital audio player is required to determine the correct individual folder associated with a supplied access code by searching folder names, and play the first media file found in that location. This unique behavior also requires that playback continue from folder to folder, not limiting playback to remain within a single folder, as is common in other MP3 player designs. Folder names can be very short and simple, so the amount of data required to process and optionally store them is now a mere fraction of the total data normally required to store MP3 access menus. Names of artists, albums, songs, and even the filenames themselves are not significant in this access method. The delays of reading and storing embedded information are eliminated, so the efficiency of allowing a desired file location to be calculated from an access code means that the media file can start playing very quickly.

The most preferred use of our folder indexing method is for improved performance of a mobile or portable juke box, such as the "vintage" juke box 10 shown and FIG. 1, having printed flipping pages 20 and track selection keys 30. Our improved method preferably utilizes a digital audio system that is controlled at least partially by a computer processing means capable of playing digital audio files. For our most basic single level access method, we assign access code "A1" to a first song title and we create an individual folder having a folder name "A1". The media file for the first song title is stored in this individual folder. When a user enters access code "A1" on the track selection keys, the computer processing means simply searches for a folder name that matches the access code, and then plays the first media file found in the matching individual folder. Those of ordinary skill in the art will appreciate that the appearance shown in the various figures may vary depending on the system implementation. For example, the system may have many different configurations of folder levels, possible formats for the folder names, and the access method could be automatically generated by a software program. The depicted examples are not meant to imply architectural limitations with respect to the present invention. The digital audio files may exist in compressed data formats, such as MP3, WMA, Real-Audio, or other suitable audio compression formats, or the files may exist in uncompressed format, which allows playback of standard format CD-DA compact discs. Although this description will discuss our most preferred embodiment, these preferences are not intended to exclude suitable or functionally equivalent alternatives.

To operate the system, a user browses song titles 22 displayed on a menu. The menu is typically maintained on numerous printed flipping pages 20, similar to a vintage juke box. Adjacent each of the song titles, there is an access code 40 that is at least partially comprised of symbols, preferably one alpha symbol and one numeric symbol. Access codes may be entered by a user to request playback of digital audio files associated with song titles. A user may enter a song selection by actuating a combination of track selection keys 30 bearing the symbols of the access code identified with a song title. The term "track selection keys" includes, but is not limited to, buttons and pushbuttons. FIG. 2 shows an example of the format of a first printed flipping page that could be used with a 10×10 menu of song titles, noting that pages are usually displayed as pairs that are held by page frames within the juke box unit. The access codes are shown along a border of each page frame to follow convention, but location of the access codes is a matter of preference. FIG. 3 shows the preferred array of access codes that are available with a 10×10 menu of song titles.

The track selection keys 30 may include as many rows 32 of keys as desired, and the symbols don't need to be alpha or numeric. For example, supplemental Red and Blue track selection keys could be added as part of another row of keys that must be selected as a separate symbol of an access code, preferably indicating the color of a printed flipping page, so there could be a "Red J7" and a "Blue J7". Symbols from other languages could also be used. The symbols for a juke box specially designed for children might use drawings of triangles, elephants, apples, or other recognizable shapes or objects. A folder name can't have a drawing of an apple, so at the software level all access code symbols have been assigned or converted into characters or values that are well suited for the purpose of searching folder names.

The juke box 10 is controlled using a computer processing means for processing data. The computer processing means is capable of scanning track selection keys 30, searching file folders, playing digital audio files, and otherwise controlling the electronic functions of the juke box unit. A preferred data processing system, shown in the block diagram of FIG. 4, is a digital audio system with a basic computer architecture. Those of ordinary skill in the art will appreciate that the hardware may vary depending on the system implementation, and this description is not meant to imply architectural limitations. For example, the system may have one or more processors, and other peripheral devices may be used in addition to or in place of the hardware described.

Figure 5:
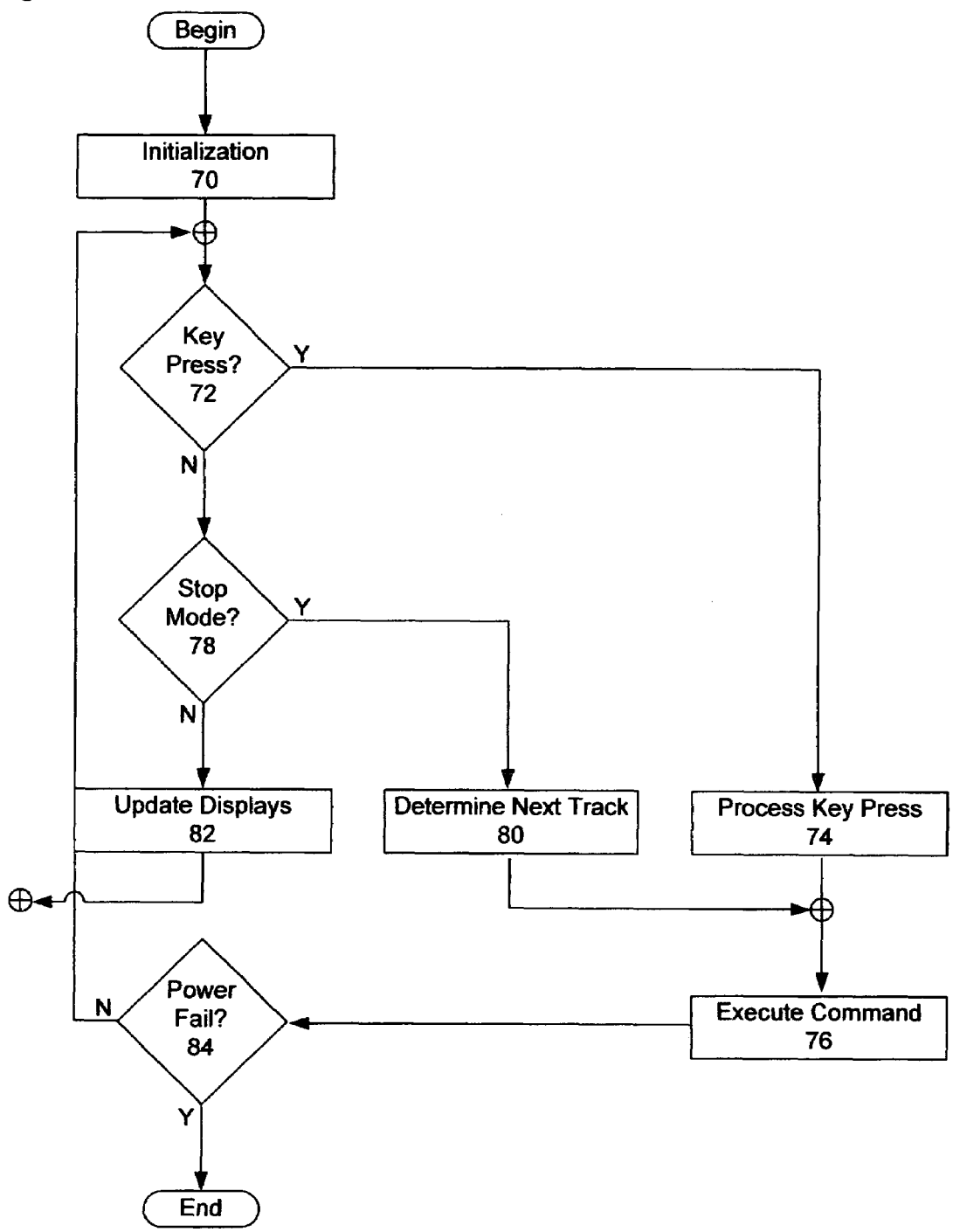
FIG. 5 is a flowchart showing some of the processing that may be performed in the main software loop of a digital audio file storage and playback unit in accordance with a preferred embodiment of the present invention.

The data processing system is controlled by an MPU (micro processing unit) 54 that scans a large array of switches, allowing a user to control the system. Power to the system is provided by a power supply 50. The MPU can be a common controller, such as an Intel 8051 eight bit microcontroller, which integrates the memory and other peripherals required into a single inexpensive chip. One group of the scanned switches forms the track selection keys 30. Feedback to the user may be provided by a track annunciator, not shown, and an LCD screen that can scroll text and otherwise display system status. The MPU controls the digital audio storage unit 56. Based on a user's selection, the system provides audio streams to an amp and digital audio decoder 58 that drives speakers 60.

Where a user's selection is from a database, the possible databases may be stored in any form of digital memory, including CD, hard drive, or FLASH. In addition to being able to be implemented on a variety of hardware platforms, the present invention may be implemented in a variety of software environments. A typical operating system or software runtime environment may be used to control program execution within the data processing system. FIG. 5 shows a flowchart of a preferred main loop of an operating system suitable for the computer processor of the present invention. The main loop, which shows some of the processing that may be performed by the MPU, is the highest level of the software. The main loop begins when power is applied from a power supply. The system performs a startup Initialization step 70. The MPU then scans keys, including the track selection keys, until the system detects a key press 72 from a user. When a key press is detected, there is a process key press step 74 that causes the system to execute a command 76, such as to search file folders, update the annunciator, play an audio file, or power on the system. Unless there is a power failure 84, once a command is executed the system waits to detect the next key press. If no next key press is detected, then the system tests for entry into a stop mode 78, which is usually when an audio file has completed playback and the system must now determine the next track 80, if any, to be played. If stop mode is not detected, then the system will update displays 82. This main loop never ends unless power to the system is lost.

How the MPU associates detected key presses with an audio file is a software function. Our preferred folder indexing method is to create an individual folder for each of the access codes, store the media files and any information that could be displayed by an LCD screen in the correct individual folder, and then just convert the key presses associated with an access code into a file location that directs the MPU to the correct individual folder when it is time to play an access code. There is a playback means, such as the amp and digital audio decoder 58 with speakers 60 shown in FIG. 4, for playback of a digital audio file associated with an access code. The media files don't need to be edited, so filenames and all of the embedded information can be completely ignored. Also, a media file does not need to be a single song, so a media file could include images, be just a brief sound, or it could be several songs that are intended to be sequentially played as a group.

Figure 6:
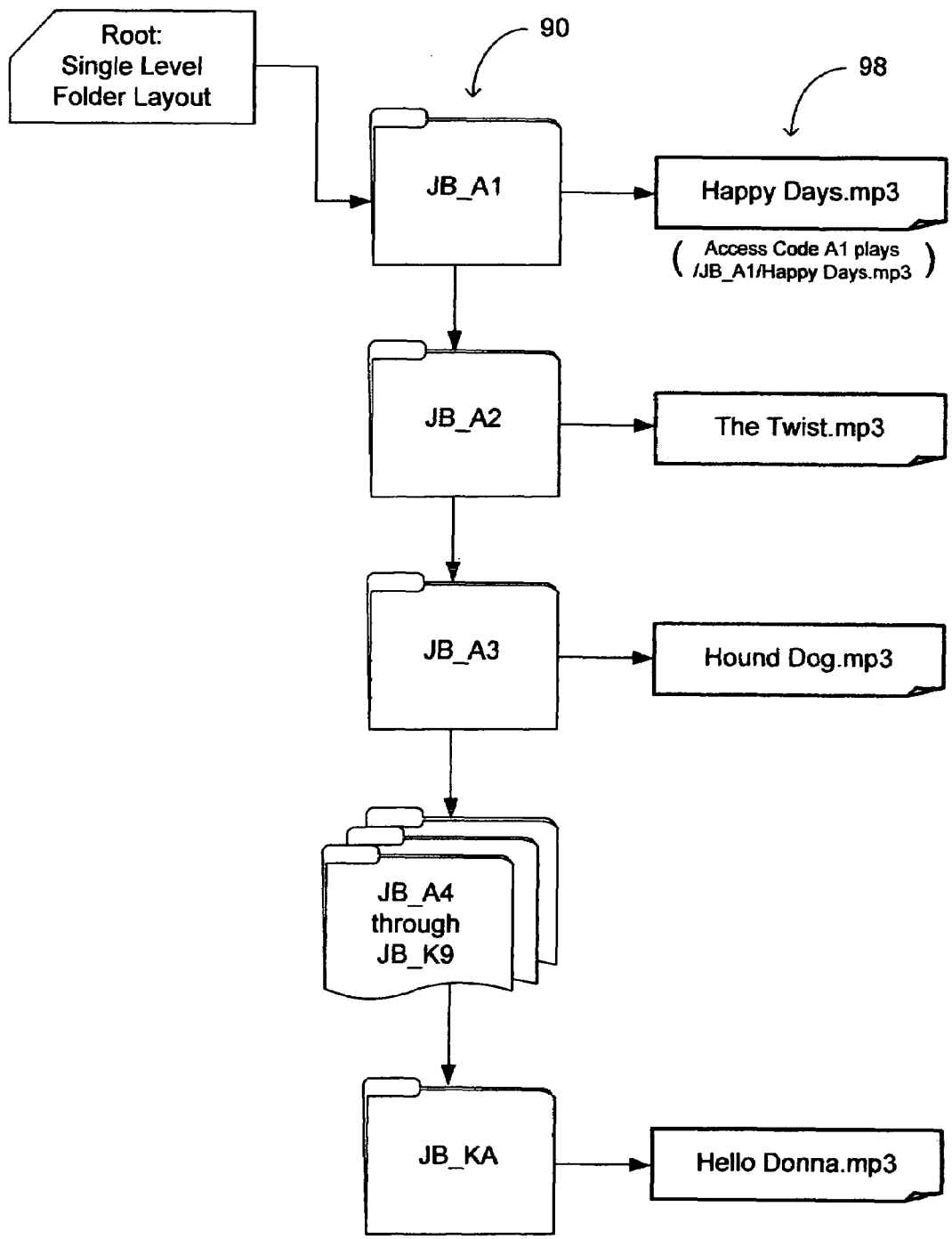
FIG. 6 shows a single level folder layout that could be used for indexing 100 song titles.

A single-level folder layout, such as the one shown in FIG. 6, has the ability to define the order of the song titles without the need to modify the media files 98 themselves in any way, and also provides the advantage of eliminating the delay of reading large amounts of data embedded in the audio files. For example, a single-level folder can contain a search term that fully identifies the access code of a song selection. Access code "A1" might be found by locating a first-level folder 90 having the search term "A1". In FIG. 6, this means that the media file "Happy Days.mp3" would be played. Reducing access codes and folder names to index values would make the method even faster, but that would limit the single-level folder layout. With regard to the scaling of CD's playing on a wide variety of compatible player designs, a CD with 200 songs will end up with different access codes mapped to each song in different players with different track selection key formats, so the access codes might need to be converted so they are linked to the correct folder names. For example, consider the $11^{th}$ folder found on a CD in a single level format. On a player which can play 100 different tracks, which might have a 10×10 keypad format with 10 song titles per page, the 11th song title would have access code "B1". However, on a player which can play 196 song titles, and might have 14×14 keypad format with 14 song titles per page, the $11^{th}$ song title would have access code "A11". Since it is impossible to predict all possible keypad formats, it would also be impossible to supply printed cards in all possible formats. A single level folder layout is very easy to understand, so it is useful when a user wants to custom create their own CD and make their own corresponding printed flipping pages.

Figure 7:
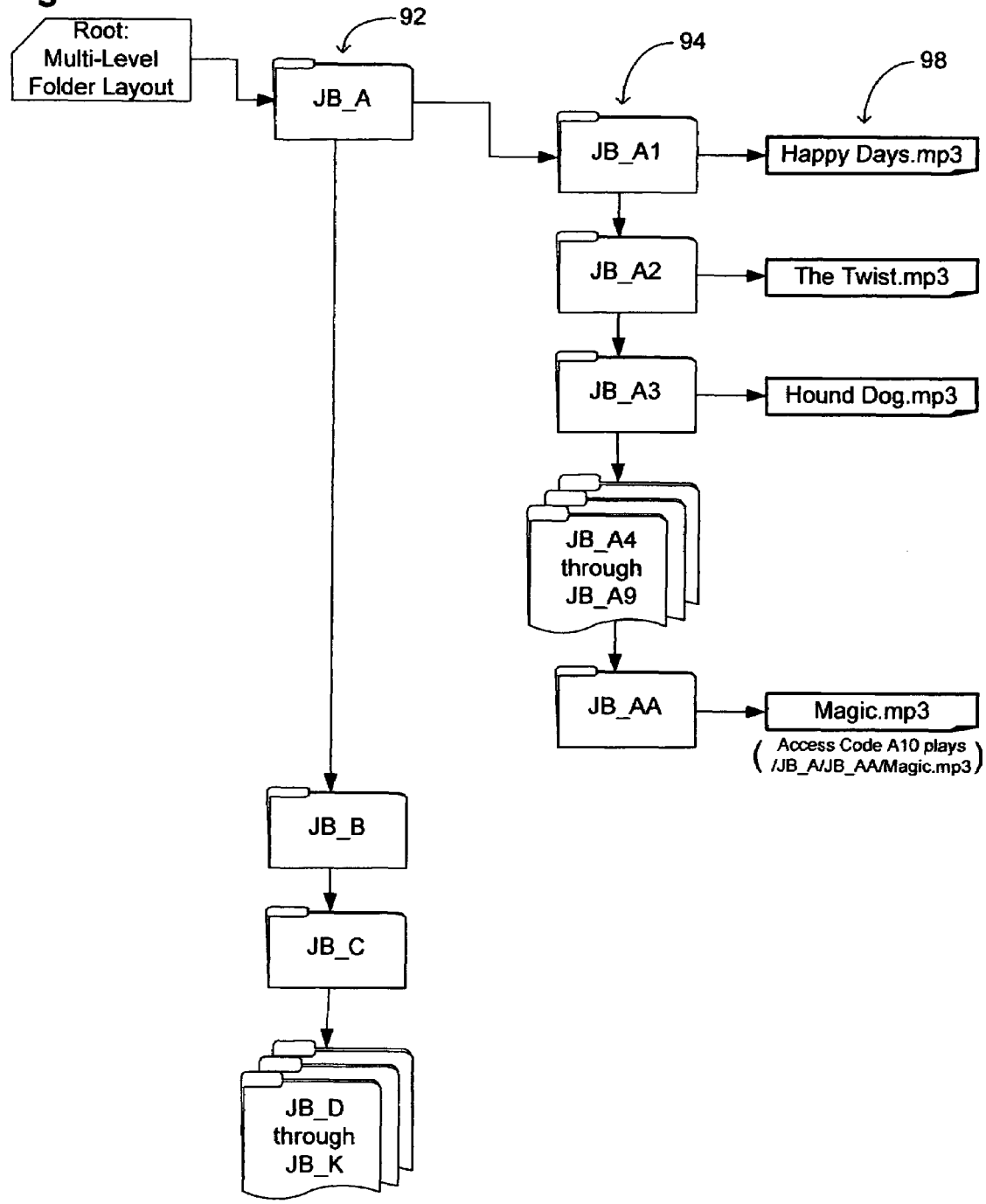
FIG. 7 shows a multi-level folder layout that could be used for indexing 100 song titles.

A multi-level folder layout, such as the one shown in FIG. 7, is preferred because it provides a format that is compatible with a wide variety of players. If there are two rows 32 of track selection keys 30, such as shown in FIG. 1, then each row should be represented by a folder level. The symbols on the track selection keys are relevant to a user who is entering an access code, but for the processing used by our folder indexing method, only the order of the keys are important. For each row, the first key has an index value of one, the second key has an index value of two, and so on to the end of a row of keys. In this way, the keys can display alpha symbols, numeric symbols, or even pictures, but that doesn't affect the fact that the first key of a row has an index value of one. We arbitrarily chose the top left key to be the first key in the first row, but a different starting point is possible so long as it is consistent. The first row of track selection keys represents the first-level folders 92 for a multi-level folder layout, and the symbols of the first row are preferably associated with the page names of printed flipping pages. The second row of track selection keys represents the second-level folders 94, which are subfolders of the first-level folders, and the symbols of the second row are preferably associated with the order of song titles on the printed flipping pages. When a user enters access code "A10", they are requesting page "A", song title "10". The folder indexing method sees this as a request for the first first-level folder to be opened, and for the media file stored in the tenth second-level folder to be played. Most preferably, the folder names include characters that can be alpha sorted so that the folder names do not even need to be viewed to find a particular folder because the "A10" request was for the first alpha sorted first-level folder to be opened, and for the media file stored in the tenth alpha sorted second-level folder to be played. Because numeric characters are alpha sorted before alpha characters, we can use a folder name's "A" to represent an index value of "1" for the first-level and "10" for the second-level. By example, FIG. 7 will locate the folder for access code "A10" by going to the tenth alpha sorted folder in "JB_A", which is folder "JB_AA", and then the player will play "JB_A/JB_AA/Magic.mp3". A multi-level folder layout has the additional advantage of allowing the printed flipping pages of a larger system to be trimmed, such as by tearing off songs "A11" through "A 14", so that the pages can be used in a smaller system.

The above described single-level and multi-level folder layouts can be switched around, if desired, or added to. A single-level folder layout can alpha sort folder names and use index values, or a multi-level folder layout can use parsing to identify access code characters that are then used as search terms. For example, access code "J7" might be found by locating a first-level folder having the parsed search term "J", and then by locating a second-level folder, or subfolder, having the parsed search term "7". If there is a third row of track selection keys, then third-level folders that are subfolders to the second-level folders should be created, and the media files should be stored in the third-level folders.

For the actual folder names, we use names that are descriptive to a user, but that are also easily alpha sorted. For access code "J7", the first row search term "J" has the index value 9, as it is the $9^{th}$ alpha key, so the folder could have a name of "JB_Page_09". Note that the letter "J" is actually the tenth letter of the alphabet, but alpha sorting skips any letters we skip. This folder name was chosen to be very indicative of its purpose, though any folder names could be used since the alpha sort order is all that is significant. This process is then repeated to calculate the index value for the second, numeric, value of the access code. In the example, the second value "7" has the index value 7, as it is the $7^{th}$ key. This index value is used to calculate the $7^{th}$ folder location, in alphabetically sorted order, on the second-level of folders found within the first-level folder that was calculated. In the example, the $7^{th}$ second-level folder could have a name of "JB_Song_07", and the folder value is 7. This folder name was also chosen to be very indicative of its purpose, though any folder names could be used since the alpha sort order is all that is significant. In other words, just sort the names in the second-level folder and pick the $7^{th}$ one, the one having a folder value equal to the index value.

There will be only one track located in each second-level folder, so the first track found in this file location can be played immediately without further verification. In the example, the access code "J7" is linked to the file location "JB_Page_09\JB_Song_07". This value would usually be added to the root folder name for all digital audio track storage, such as "C:\Juke box\CD_1\", which will vary by implementation. It is important to remember that these folder names are not specific, and will also vary by implementation. This is especially true of CD based implementations because the CD will be changed often, and CD products from different vendors will vary greatly. Even in these extreme cases, this approach provides wide flexibility with respect both to the folder names used in the storage system, and the format of the track access keypad which must be linked to the folder structure.

If an index value is used to locate a folder, which is the preferred method, the MPU executes a Convert Code procedure when the Execute Command 76 of FIG. 5 processes a track selection key press. The Convert Code procedure starts by parsing the access code into characters. Next, an index value is calculated for the first character, and then the index value is used to calculate a first-level folder. Next, an index value is calculated for the second character, and then the index value is used to calculate a second-level folder. Finally, the first-level and second-level folder locations are combined to locate a stored media file. Care must be taken as different players may not use consecutive values for track selection keys. For instance, the letter "I" is often skipped to avoid confusion with the digit "1", so in our "J7" example, the parsed "J" is converted to an index value of 9, as it is the $9^{th}$ key. The parsed "7" is converted to an index value of 7, as it is the $7^{th}$ key.

The whole process of getting from an access code to a media file can be reversed such that a folder location of a media file can be converted into an access code. Determining an access code is useful for a juke box that has a random play function. Where the access code is used as search terms found in folder names, the search terms just need to be combined to show the access code. Where index values are used to locate folders, the MPU executes a convert location procedure when the Execute Command 76 of FIG. 5 processes an Initiate Playback step. The Convert Location procedure starts by parsing the file location into first and second-level folder names. Next the first-level folder name index value is calculated by alphabetically sorting all the folder names on the first-level and comparing each value for a match. The index of the match is then used to calculate the corresponding key value in the first row of the track selection keypad. This process is then repeated to calculate the second-level folder name index from the names of folders found within the first-level folder. The second-level folder name index is then used to calculate the key value in the second row of the track selection keypad. The first row key value is then combined with the second row key value to create the access code that can then be displayed, such as on a track annunciator or on an LCD screen. The Convert Location procedure preferably doesn't occur until after the audio data stream has been started. In our "J7" example, the file location "JB_Page_09\JB_Song_07" is shown to be linked to the access code "J7" on the given track selection keypad implementation. To look up information of the track that is playing, the customer can turn the printed flipping pages of available song titles to show the "H" and "J" pages and easily look up access code "J7".

To make our folder indexing method more user friendly, a computer software program can be provided that automatically assigns song titles to folders linked to access codes, and then automatically formats the printed flipping pages using the automatic assignment, using embedded information of media files to obtain song titles and artist names. A user simply selects which songs they want on their juke box by selecting media files from a music collection, and then the software creates a CD and printed flipping pages that are ready to use.

Some additional considerations when using our folder indexing method include allowing continuous playback of music to move from folder to folder rather than being stuck in the same folder the way that most MP3 players remain within the same folder. If playback remains in only one folder, then the same song is played endlessly because there is only one media file per folder. Similarly, any skip buttons 42, shown in FIG. 1, must direct playback to switch from one individual folder to another. If the one media file is an entire album, which would be like playing the original CD, then the skip buttons would move to another folder rather than to another song in that folder. Finally, even though our folder indexing method doesn't use embedded information in media files, the embedded information may be used for other purposes, such as displaying artist and title information on an LCD screen 44 after a media file is located.

While a preferred form of the invention has been shown and described, it will be realized that alterations and modifications may be made thereto without departing from the scope of the following claims.

What is claimed is:

1. A method for accessing media files comprising the steps of:
   defining numerous access codes that are at least partially characterized by symbols;
   assigning an index value to each of the access codes;
   creating numerous individual folders having folder names that each contain searchable characters or values;
   storing one media file in each of the numerous individual folders;
   alpha-sorting the folder names;
   assigning an index value to each of the folder names based on the alpha-sorting;
   locating an individual folder by matching the index value of an access code to the index value assigned to one of the folder names; and
   automatically playing the media file stored in the individual folder.

2. The method of claim 1 further comprising the step of parsing the access codes.

3. The method of claim 1 wherein the media file stored in at least one of the individual folders is a group of songs intended to be sequentially played as a group.

4. The method of claim 1 further comprising the step of not searching, reading or storing any embedded information contained in any of the media files until after a selected individual folder has been located.

5. The method of claim 1 further comprising the step of displaying on a screen at least part of the embedded information contained in a media file after a selected individual folder has been located.

6. A method for accessing media files comprising the steps of:
   defining numerous access codes;
   assigning a first and a second index value to each of the access codes;
   creating numerous first-level folders having, first folder names;
   alpha sorting the first folder names;
   assigning a first index value to each of the first-level folders based on the alpha sorting of the first folder names;
   creating numerous second-level folders having second folder names;
   alpha sorting the second folder names inside of the first level folders;
   assigning a second index value to each of the second-level folders based on the alpha-sorting of the second folder names;
   storing a media file in each of the numerous second-level folders;
   locating a first-level folder by matching the first index value of an access code to the first-level index value assigned to one of the first-level folder names;
   locating a second-level folder by matching the second index value of an access code to the second-level index value assigned to one of the second-level folder names that is stored inside the located first-level folder; and
   automatically playing the media file stored in the second-level folder.

7. The method of claim 6 further comprising the step of parsing the access codes.

8. The method of claim 6 wherein the media file stored in at least one of the second-level folders is a group of songs intended to be sequentially played as a group.

9. The method of claim 6 further comprising the step of not searching, reading or storing any information embedded in any of the media files until after locating a selected second-level folder.

10. The method of claim 6 further comprising the step of displaying on a screen at least part of any information embedded in a media file after locating a selected second-level folder.

11. The method of claim 6 further comprising the step of continuing playback of media files by moving from one second-level folder to another after the step of playing the media file is completed.

12. The method of claim 6 further comprising the step of providing numerous printed flipping pages for displaying the access codes adjacent song titles.

13. The method of claim 6 further comprising the step of providing at least one skip button that ends playing the media file found in the selected second-level folder and immediately begins playing a media file from a different second-level folder.

* * * * *